(12) United States Patent
Jeong

(10) Patent No.: US 7,770,516 B2
(45) Date of Patent: Aug. 10, 2010

(54) APPARATUS AND METHOD FOR FORMING PATTERN

(75) Inventor: Tae Kyun Jeong, Paju-si (KR)

(73) Assignee: LG. Display Co., Ltd., Seoul (KR)

( * ) Notice: Subject to any disclaimer, the term of this patent is extended or adjusted under 35 U.S.C. 154(b) by 381 days.

(21) Appl. No.: 11/455,519

(22) Filed: Jun. 19, 2006

(65) Prior Publication Data

US 2007/0151469 A1   Jul. 5, 2007

(30) Foreign Application Priority Data

Dec. 29, 2005   (KR) ............... 10-2005-0133110

(51) Int. Cl.
*B41F 1/00* (2006.01)
*B41F 9/14* (2006.01)
*H01L 21/31* (2006.01)
*H01L 21/469* (2006.01)

(52) U.S. Cl. ............... 101/164; 101/168; 438/778

(58) Field of Classification Search ............... 101/425, 101/156, 162, 164, 165, 166, 168, 215; 438/778
See application file for complete search history.

(56) References Cited

U.S. PATENT DOCUMENTS

| | | | | |
|---|---|---|---|---|
| 4,757,763 A | * | 7/1988 | MacPhee et al. ............. | 101/425 |
| 5,705,447 A | * | 1/1998 | Kubo ..................... | 442/334 |
| 6,296,034 B1 | * | 10/2001 | Kodera et al. ............. | 156/540 |
| 6,729,230 B1 | * | 5/2004 | Okawa et al. ............. | 100/73 |
| 6,835,583 B2 | * | 12/2004 | Yi et al. ................. | 438/30 |
| 2003/0209159 A1 | * | 11/2003 | Porat et al. .............. | 101/425 |

FOREIGN PATENT DOCUMENTS

| | | | |
|---|---|---|---|
| JP | 06-003522 | | 1/1994 |
| JP | 06305108 | * | 11/1994 |
| JP | 11-198377 | * | 7/1999 |
| KR | 10-2003-0028924 A | | 4/2003 |
| KR | 10-2005-0105043 A | | 11/2005 |
| KR | 10-2005-0105046 A | | 11/2005 |

OTHER PUBLICATIONS

Office Action issued in corresponding Korean Patent Application No. 10-2005-0133110; issued Mar. 31, 2009.

* cited by examiner

*Primary Examiner*—Judy Nguyen
*Assistant Examiner*—Leo T Hinze
(74) *Attorney, Agent, or Firm*—Brinks Hofer Gilson & Lione

(57) ABSTRACT

An apparatus and method for forming a pattern is provided, to improve a yield by decreasing the tack time for cleaning a printing plate. The apparatus includes a stage; a substrate loaded on the stage; a printing plate positioned on the stage; a printing unit that prints a printing material patterned by a predetermined pattern of the printing plate on the substrate; and a removing unit having a film so as to remove the unused printing material of the printing plate.

5 Claims, 4 Drawing Sheets

APPARATUS AND METHOD FOR FORMING PATTERN

This application claims the benefit of the Korean Patent Application No. P2005-133110, filed on Dec. 29, 2005, which is hereby incorporated by reference as if fully set forth herein.

BACKGROUND

1. Field of the Invention

The present invention relates to an apparatus that forms a pattern.

2. Discussion of the Related Art

Recently, various flat panel displays that reduce weight and volume of a cathode ray tube have been developed. Examples of the flat panel displays include a liquid crystal display (LCD) device, a field emission display (FED), a plasma display panel (PDP), and a light emitting display (LED).

The LCD device displays images by controlling light transmittance of liquid crystal with an electric field. The LCD device includes an LCD panel having a plurality of liquid crystal cells arranged in a matrix type, and a driving circuit for driving the LCD panel.

The LCD panel is comprised of a plurality of pixel electrodes and a common electrode, wherein the plurality of pixel electrodes apply an electric field to the respective liquid crystal cells. The pixel electrodes are formed in the respective liquid crystal cells on a lower substrate, and the common electrode is formed on an entire surface of an upper substrate. The pixel electrodes are respectively connected with a plurality of thin film transistors TFTs used as switching elements. The pixel electrodes and the common electrode drive the liquid crystal cells in response to data signals supplied through the TFTs.

FIG. 1 is a cross sectional view of a general LCD panel. As shown in FIG. 1, the general LCD panel includes a color filter array substrate 4, a TFT array substrate 2, and a liquid crystal layer 52. The color filter array substrate 4 is comprised of a black matrix layer 44, a color filter layer 46, an overcoat layer 47, a common electrode 48 and an upper alignment layer 50a which are sequentially formed on an upper substrate 42. The TFT array substrate 2 is comprised of a TFT, a pixel electrode 22 and a lower alignment layer 50b which are sequentially formed on a lower substrate 1. The liquid crystal 52 is formed in a space between the color filter array substrate 4 and the TFT array substrate 2.

The TFT of the TFT array substrate 2 is comprised of a gate electrode 6 connected with a gate line, a source electrode 8 connected with a data line, and a drain electrode 10 connected with the pixel electrode 22 by a drain contact hole 26. In addition, the TFT includes semiconductor layers 14 and 16 for forming a charged channel between the source electrode 8 and the drain electrode 10 by a gate voltage supplied to the gate electrode 6. The TFT selectively supplies a data signal of the data line to the pixel electrode 22 in response to a gate signal of the gate line.

The pixel electrode 22 is positioned in a pixel region defined by the gate and data lines. The pixel electrode 22 is formed of a transparent conductive material having a high light transmittance. The pixel electrode 22 is formed on a passivation layer 18 coated on an entire surface of the lower substrate 1, and the pixel electrode 22 is electrically connected with the drain electrode 10 by the drain contact hole 26 passing through the passivation layer 18. A potential difference is generated between the pixel electrode 22 of the lower substrate 1 and the common electrode 48 of the upper substrate 42 by the data signal supplied through the TFT. For example, the liquid crystal 52 having dielectric anisotropy is twisted by the potential difference generated between the pixel electrode 22 and the common electrode 48. As a light source emits light, the amount of light transmitted toward the upper substrate 42 through the pixel electrode 22 is controlled by the twisted liquid crystal 52.

The black matrix layer 44 of the color filter array substrate 4 is formed corresponding to the TFT and the gate and data lines of the lower substrate 1. The black matrix layer 44 divides the pixel regions for the color filter layer 46. The black matrix layer 44 prevents light leakage and improves contrast ratio.

The color filter layer 46 is formed corresponding to the pixel regions divided by the black matrix layer 44. The color filter layer 46 is formed of red(R), green(G) and blue(B) filters, so as to express red, green and blue colors.

The overcoat layer 47 is formed on the upper substrate 42 having the color filter layer 46. The overcoat layer 47 is formed by coating a transparent resin having the insulating characteristics on the upper substrate 42. The overcoat layer 47 is provided for an electric insulation between the black matrix layer 44 and the common electrode 48. In the case of a TN mode LCD device, it is unnecessary to provide the overcoat layer 47.

A common voltage is applied to the common electrode 48, wherein the common voltage serves as a reference voltage for driving the liquid crystal. As explained above, the common electrode 48 and the pixel electrode 22 generate the potential difference. In the case of an IPS mode LCD device, the common electrode is formed on the lower substrate 1.

The upper and lower alignment layers 50a and 50b used for alignment of the liquid crystal are respectively formed on the color filter array substrate 4 and the TFT array substrate 2. The upper and lower alignment layers 50a and 50b are formed in steps of coating an alignment material such as polyimide PI, and rubbing the coated alignment material.

The liquid crystal 52 is formed in the space provided between the color filter array substrate 4 and the TFT array substrate by ball spacers and column spacers.

The above-mentioned various elements of the LCD panel are formed by repeated processes. A photolithography is generally used to pattern the various elements of the LCD panel.

To perform photolithography, a patterning material layer is formed on the substrate, and a mask of a predetermined pattern is positioned above the pattern material layer. In this state, light is applied to the entire surface of the substrate, thereby forming a desired pattern.

However, the photolithography has a disadvantage of high manufacturing cost since the photolithography necessarily uses the mask of the predetermined pattern. Since the photolithography requires a development process, it complicates the process and increases process time.

To overcome the problems of photolithography, a patterning apparatus using a printing roller has been proposed.

FIG. 2 is a schematic view of a patterning apparatus using a printing roller according to the related art.

As shown in FIG. 2, the patterning apparatus using the printing roller according to the related art is provided with a stage 110, a substrate 120 loaded onto the stage 110, a printing plate 130 loaded onto the stage 110 in parallel to the substrate 120, a printing unit 140 for printing the substrate 120 with a printing material 148 having a predetermined pattern of the printing plate 130, and a cleaning unit 150 for cleaning the printing plate 130.

The stage 110 supports the loaded substrate 120 with a substrate loading unit which is not shown. Disposed on the stage 110 is the substrate 120 and the printing plate 130 in parallel, wherein the printing plate 130 has the predetermined pattern of the printing material 148 to be printed on the substrate 120.

The printing plate 130 is positioned at a predetermined interval with the substrate 120 on the stage 110. The printing plate 130 has the predetermined pattern of the printing material 148 to be printed on the substrate 120.

The printing unit 140 is comprised of a printing roller 142, a blanket 144, and a nozzle 146. As the printing roller 142 is operated by a driving unit, the printing roller 142 is moved toward the printing plate 130 and the substrate 120 by rolling.

The blanket 144 is adhered to an outer surface of the printing roller 142, so as to print the printing material 148 patterned by the printing plate 130 on the substrate 120.

Through the nozzle 146, the printing material 148 is uniformly coated on the blanket 144. The printing material 148 is formed of ink such as photoresist.

The cleaning unit 150 is comprised of a spraying part and a drying part. The cleaning unit 150 cleans the printing material 148 left unused on the printing plate 130 after patterning the printing material 148.

A patterning method using the patterning apparatus of the related art will now be explained. While rolling the printing roller 142, the printing material 148 is supplied through the nozzle 146, and is coated on the surface of the blanket 144.

After positioning the printing roller 142 above the printing plate 130, the printing roller 142 is brought into contact with the predetermined pattern of the printing plate 130.

The printing material 148 coated on the blanket 144 is patterned by the printing plate 130. Since the adhesive strength between the printing plate 130 and the printing material 148 is larger than the adhesive strength between the blanket 144 and the printing material 148, the printing material 148 is printed on the predetermined pattern 132 of the printing plate 130.

After positioning the printing roller 142 above the substrate 120, the printing material 148 patterned on the blanket 144 is printed on the substrate 120 by rolling the printing roller 142. The printed material sticks to the substrate because an adhesive strength between the substrate 120 and the printing material 148 is larger than an adhesive strength between the blanket 144 and the printing material 148.

The printing unit containing the printing roller 142 is then positioned at an original state.

As shown in FIG. 4, after positioning the cleaning unit 150 above the printing plate 130, a cleaning solution is sprayed to the printing plate 130 by the spraying part. The cleaning solution may be formed of liquid chemical or ultra pure water DI. The spraying part of the cleaning unit 150 may have an additional brush. The drying part of the cleaning unit 150 dries the cleaning solution sprayed on the printing plate 130. After that, the cleaning unit 150 is positioned at an original state.

The patterning apparatus and method of the related art have disadvantages.

The patterning apparatus and method of the related art use a liquid chemical such as acetone in an open space. Using a liquid chemical requires additional cleanup. Thus, the cost and task time for performing a treatment to remove the environmental stink and the used liquid chemical is increased because additional cleanup is required.

SUMMARY

The present invention is directed to an apparatus and method for forming a pattern, which substantially obviate one or more problems due to limitations and disadvantages of the related art.

A patterning apparatus is provided that comprises a stage. A substrate and a printing plate are positioned on the stage. A printing unit that prints a pattern on the substrate with a printing material patterned by a predetermined pattern of the printing plate. A removing unit having a film so as to remove the unused printing material of the printing plate.

A patterning method is provided comprising positioning a printing plate having a predetermined pattern and a substrate on the stage. Patterning a printing material according to the predetermined pattern of the printing plate, so as to print the printing material on the substrate. Removing the printing material from the predetermined pattern of the printing plate with a film.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A patterning apparatus and method according to the present invention will be described with reference to the accompanying drawings.

Figure 1:
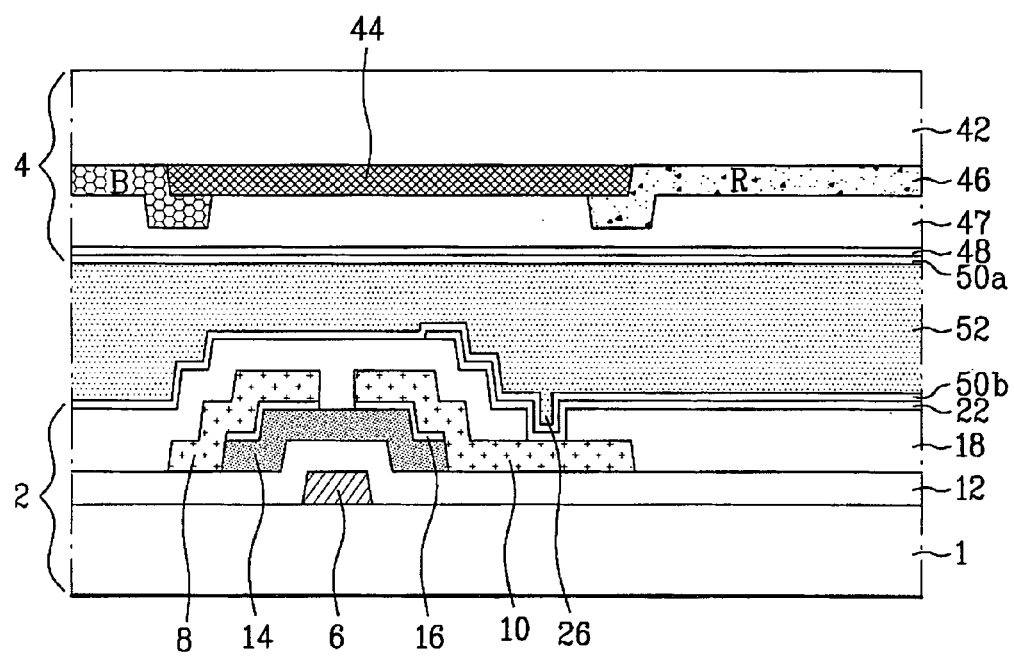
FIG. 1 is a cross sectional view of a general LCD panel according to the related art.
Figure 2:
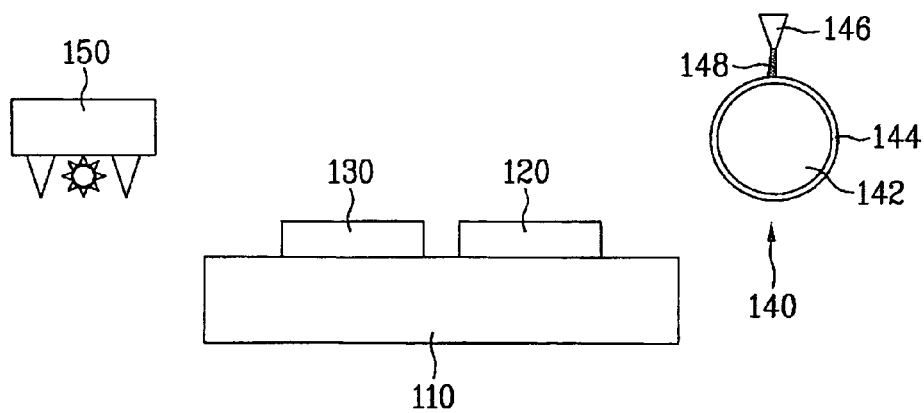
FIG. 2 is a schematic view of a patterning apparatus using a printing roller according to the related art.
Figure 3:
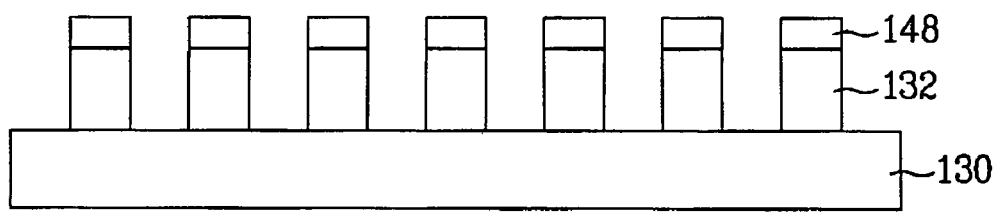
FIG. 3 is a schematic view of a printing plate shown in FIG. 2.
Figure 4:
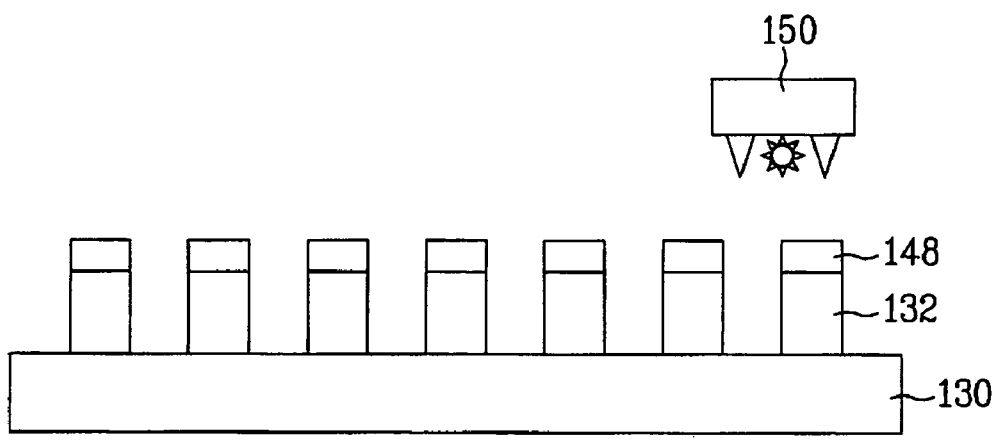
FIG. 4 is a schematic view of a cleaning process of a printing plate shown in FIG. 2.
Figure 5:
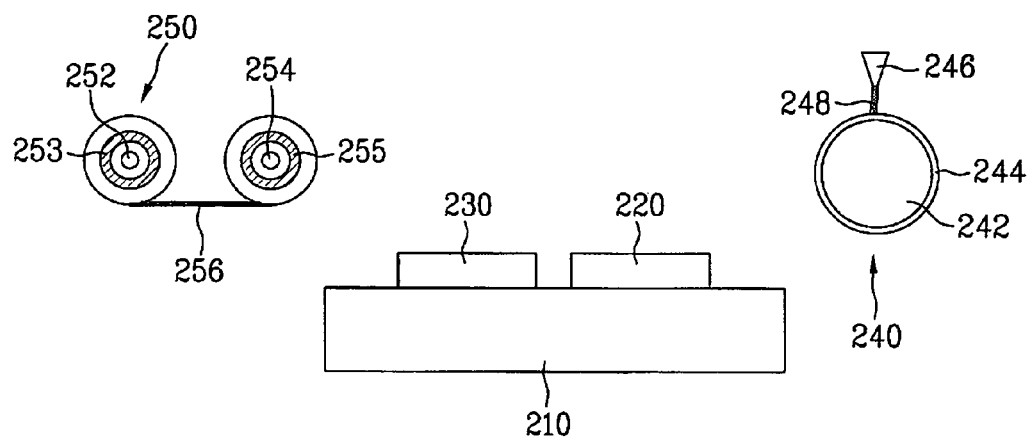
FIG. 5 is a schematic view of a patterning apparatus according to the preferred embodiment of the present invention.

FIG. 5 is a schematic view of a patterning apparatus according to the preferred embodiment of the present invention.

As shown in FIG. 5, the patterning apparatus according to the preferred embodiment of the present invention is provided with a stage 210, a substrate 220 loaded on the stage 210, a printing plate 230 positioned on the stage 210 in parallel to the substrate 220, a printing unit 240 for printing the substrate 220 with a printing material 248 patterned by a predetermined pattern of the printing plate 230, and a removing unit 250 having a sticky film 256 so as to remove the unused printing material of the printing plate 230.

The stage 210 supports the loaded substrate 220 with a substrate loading unit which is not shown. On the stage 210, there are the substrate 220 and the printing plate 230 in parallel, wherein the printing plate 230 has the predetermined pattern of the printing material 248 to be printed on the substrate 220.

The printing plate 230 is positioned at a predetermined interval with the substrate 220 on the stage 210. The printing plate 230 has the predetermined pattern for the printing material 248 to be printed on the substrate 220. The printing plate 230 may have an ink pattern for an alignment layer pattern, an overcoat layer pattern, a black matrix pattern, a color filter (or a fluorescent substance) pattern, a column spacer pattern, and a photoresist pattern, or may have a sealant pattern for sealing the substrate, depending on the kind of the printing material 248.

The printing unit 240 is comprised of a printing roller 242, a blanket 244, and a nozzle 246.

As the printing roller 242 is operated by a driving unit which is not shown, the printing roller 242 rolls toward the printing plate 230 and the substrate 220.

The blanket 244 is adhered to an outer surface of the printing roller 242, so as to print the printing material 248 patterned by the printing plate 230 on the substrate 220.

Through the nozzle 246, the printing material 248 is uniformly coated on the blanket 244. When forming a display device, the printing material 248 may be formed of ink for an alignment later, an overcoat layer, a black matrix, a color filter (or a fluorescent substance), a column spacer, and a photoresist, or may be formed of a sealant for sealing the substrate.

The printing unit 240 may have an additional doctor blade or doctor roller positioned adjacent to the printing roller 242. The doctor blade or doctor roller is provided to coat the printing material 248 sprayed through the nozzle 246 on the blanket 244 with a constant thickness.

The removing unit 250 is comprised of first and second rollers 252 and 254, the sticky film 256, and first and second heating parts 253 and 255. The first and second rollers 252 and 254 can be rotated on their own. The sticky film 256 is wound on the first and second rollers 252 and 254. The first and second heating parts 253 and 255 provide heat to the first and second rollers 252 and 254 at a predetermined temperature.

The first and second rollers 252 and 254 which are in parallel with each other are rotated by a driving unit which is not shown.

The first heating part 253 is provided inside the first roller 252, whereby the first roller 252 is maintained at a temperature of about 30±10° C. The second heating part 255 is provided inside the second roller 254, whereby the second roller 254 is maintained at a temperature of about 30±10° C.

The sticky film 256 is wound on the first and second rollers 252 and 254. The sticky film 256 is wound on or unwound from the first and second rollers 252 and 254 by rotation of at least one of the first and second rollers 252 and 254. For example, if the first roller 252 rotates on its own axis without rolling, and the second roller 254 which rotates on its own axis rolls toward the opposite side of the first roller 252, the sticky film 256 is unwound from the first and second rollers 252 and 254. If the first roller 252 rotates on its own axis without rolling, and the second roller 254 which rotates on its own axis rolls toward the first roller 252, the sticky film 256 is wound on the first and second rollers 252 and 254.

By rolling any one of the first and second rollers 252 and 254 from one side to the other side of the printing plate 230, the sticky film 256 is brought into contact with the predetermined pattern of the printing plate 230. The removing unit 250 removes the unused printing material 248 from the predetermined pattern of the printing plate 230 by repeating the removing process at least one time.

The unused printing material 248 on the predetermined pattern of the printing plate 230 is removed in a physical method using an adhesive strength of the sticky film 256. The above method of removing the unused printing material according to the present invention is highly environmental affinitive because chemicals are not released. It is possible to decrease the cost of maintaining the removing unit, and to decrease a task time for cleaning the printing plate, thereby improving a yield, because additional clean up of the chemical liquid or water is not necessary.

A patterning method using the above patterning apparatus according to the present invention will be explained as follows.

While rolling the printing roller 242, the printing material 248 is supplied through the nozzle 246, and is uniformly coated on the surface of the blanket 244. After positioning the printing roller 242 above the printing plate 230, the printing roller 242 is brought into contact with the predetermined pattern of the printing plate 230.

Figure 6:
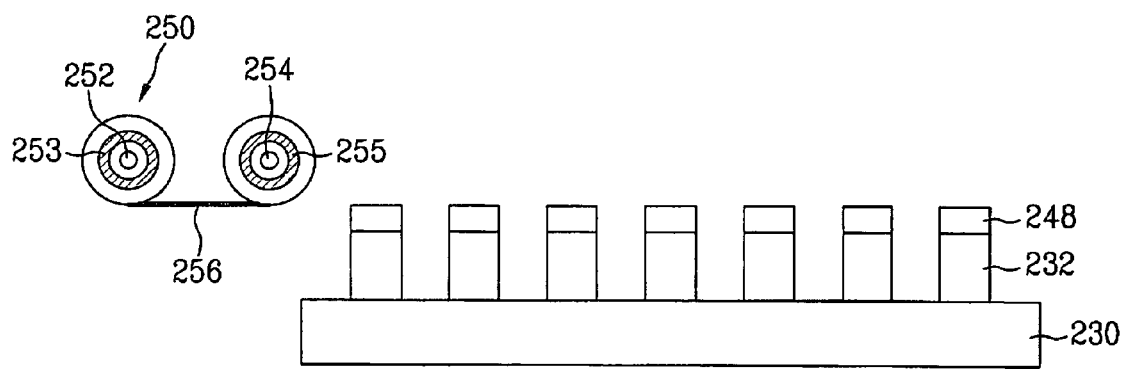
FIG. 6 is a schematic view of a printing plate shown in FIG. 5.

The printing material 248 coated on the blanket 244 is then patterned using the printing plate 230. Since the adhesive strength between the printing plate 230 and the printing material 248 is larger than the adhesive strength between the blanket 244 and the printing material 248, the printing material 248 is printed on the predetermined pattern of the printing plate 230, as shown in FIG. 6.

After positioning the printing roller 242 above the substrate 220, the printing roller 242 rolls on the substrate 220. Accordingly, the printing material 248 patterned on the blanket 244 is printed on the substrate 220 because the adhesive strength between the substrate 220 and the printing material 248 is larger than an adhesive strength between the blanket 244 and the printing material 248.

The printing unit 240 containing the printing roller 242 is then positioned at the original state.

After the patterning process, the removing unit 250 removes the unused printing material 248 from the predetermined pattern of the printing plate 230.

Figure 7A:
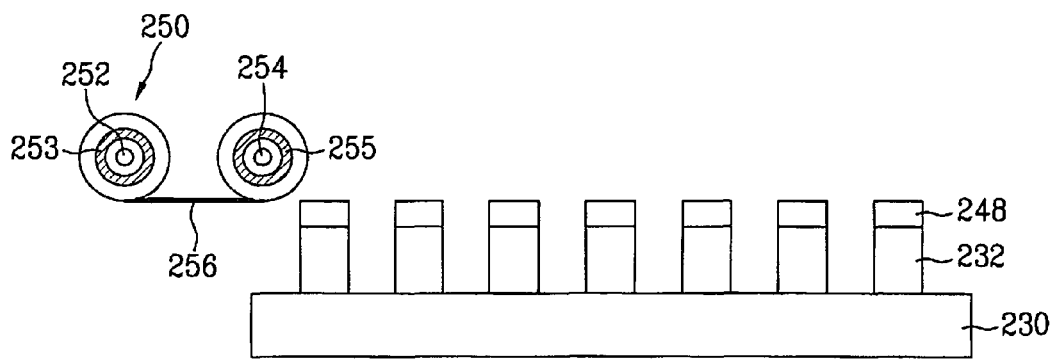
FIGS. 7A to 7C are schematic views of a patterning method according to the preferred embodiment of the present invention.
Figure 7B:
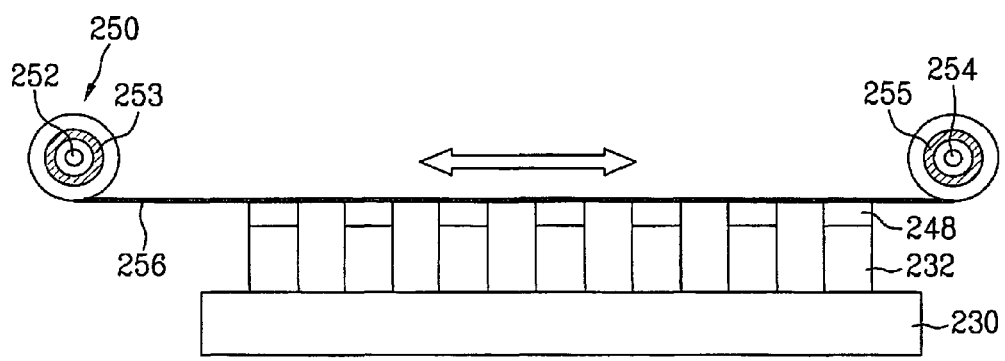
Figure 7C:
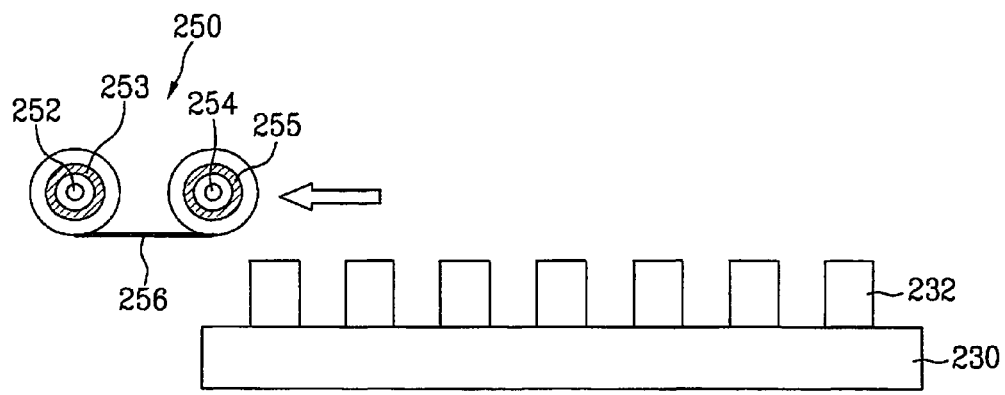

FIGS. 7A to 7C are cross sectional views of showing the cleaning method of the printing plate in the patterning method using the patterning apparatus according to the present invention.

After completing the patterning process of the substrate 220 by the printing unit 240, as shown in FIG. 7A, the removing unit 250 is moved adjacent to the printing plate 230 by the driving unit which is not shown.

As shown in FIG. 7B, the first roller 252 rotates on its own axis without rolling, and the second roller 254 rotates on its own axis and rolls away from first roller 252. Accordingly, the sticky film 256 is unwound from the first and second rollers 252 and 254, and the sticky film 256 is brought into contact with the predetermined pattern 232 of the printing plate 230. If the first roller 252 rotates on its own axis without rolling, and the second roller 254 which, rotates on its own axis rolls toward the first roller 252, the sticky film 256 is wound on the first and second rollers 252 and 254.

As shown in FIG. 7C, the sticky firm 256 removes the printing material 248 being unused on the predetermined pattern 232 of the printing plate 230. The sticky film 256 wound on the first and second rollers 252 and 254 is maintained at a temperature of about 30±10° C. by the first and second heating parts 253 and 255. The printing plate 230 is maintained at a temperature of about 23±1° C. Accordingly, the unused printing material 248 on the predetermined pattern 232 of the printing plate 230 is more adhesive to the sticky film 256 than the printing plate 230, whereby the printing material 248 is removed from the predetermined pattern 232 of the printing plate 230.

As shown in FIGS. 7B and 7C, the removing unit 250 repeatedly performs the removing process at least one time, thus removing the printing material 248 from the predetermined pattern 232 of the printing plate 230.

As mentioned above, the pattering apparatus and method according to the present invention have the following advantages.

In the patterning apparatus and method according to the present invention, the unused printing material on the predetermined pattern of the printing plate is removed in the physical method using the adhesive strength of the sticky film. Accordingly, the above method of removing the unused printing material according to the present invention is highly environmental affinitive. It is possible to decrease the cost for maintaining the removing unit, and to decrease a task time for cleaning the printing plate because the removing unit requires no additional cleanup, thereby improving a yield.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A patterning apparatus comprising:
   a stage;
   a substrate loaded on the stage;
   a printing plate positioned on the stage;
   a printing unit that prints a printing material patterned by a predetermined pattern of the printing plate on the substrate; and
   a removing unit having a film that removes the unused printing material of the printing plate;
   wherein the printing unit comprises:
   a rotatable printing roller;
   a blanket, being adhered to the printing roller, wherein the blanket prints the printing material on the substrate; and
   a nozzle that coats the printing material on the blanket;
   wherein the removing unit comprises:
   first and second rollers arranged in parallel, wherein the first roller rotates on its own axis without rolling and the second roller rotates on its own axis and rolls away from the first roller so that the film is unwound from the first and the second rollers and the first roller rotates on its own axis without rolling and rotating the second roller on its own axis toward the first roller so that the film is wound on the first and the second rollers;
   a first heating part that maintains the first roller at a constant temperature and provided inside the first roller;
   a second heating part that maintains the second roller at a constant temperature and provided inside the second roller; and
   the film being wound on the first and second rollers, wherein a surface of the film coming in contact with the printing plate has an adhesive strength.

2. The patterning apparatus of claim 1, wherein the removing unit removes the unused printing material by the film which is wound on or unwound from the first and second rollers by rolling any one of the first and second rollers being rolled from one side to the other side of the printing plate.

3. The patterning apparatus of claim 1, wherein the first and second rollers are maintained at a temperature of about 30±10° C.

4. A patterning method comprising:
   positioning a printing plate having a predetermined pattern on a stage;
   loading a substrate on the stage;
   patterning a printing material according to the predetermined pattern of the printing plate,
   printing the printing material on the substrate; and
   removing the printing material from the predetermined pattern of the printing plate with a film, wherein a surface of the film coming in contact with the printing plate has an adhesive strength;
   wherein the process of printing the printing material on the substrate comprises:
   coating the printing material on the blanket adhered to the printing roller;
   patterning the printing material coated on the blanket by using the printing plate; and
   printing the printing material patterned by the blanket on the substrate;
   wherein the process of removing the unused printing material comprises:
   rotating a first roller on its own axis without rolling and rotating a second roller on its own axis and rolls away from the first roller so that the film is unwound from the first and the second rollers;
   heating the first and second rollers at a predetermined temperature using first and second heating parts, and the first heating part is provided inside the first roller and the second heating part is provided inside the second roller; and
   rotating the first roller on its own axis without rolling and rotating the second roller on its own axis toward the first roller so that the film is wound on the first and the second rollers.

5. The patterning method of claim 4, wherein the first and second rollers are maintained at a temperature of about 30±10° C.

* * * * *